(12) United States Patent
Bednarek et al.

(10) Patent No.: US 11,299,209 B1
(45) Date of Patent: Apr. 12, 2022

(54) VEHICLE PILLAR PASS THROUGH FOR SEALING BAFFLE

(71) Applicant: Ford Global Technologies, LLC, Dearborn, MI (US)

(72) Inventors: Maciej Bednarek, Windsor (CA); Aakash Patel, Canton, MI (US); Chienhom Lee, Farmington Hills, MI (US); Jesús Alfredo Mendoza González, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 17/094,517

(22) Filed: Nov. 10, 2020

(51) Int. Cl.
*B62D 25/04* (2006.01)
*B62D 29/00* (2006.01)

(52) U.S. Cl.
CPC ........... *B62D 25/04* (2013.01); *B62D 29/002* (2013.01)

(58) Field of Classification Search
CPC ....... B62D 25/02; B62D 25/04; B62D 29/002
USPC ....................................... 296/193.06, 187.02
See application file for complete search history.

(56) References Cited

U.S. PATENT DOCUMENTS

| 6,382,635 | B1 | 5/2002 | Fitzgerald |
| 8,911,008 | B1 * | 12/2014 | Campbell ............. B60J 7/0084 |
| | | | 296/213 |
| 2006/0043772 | A1 | 3/2006 | Richardson |

FOREIGN PATENT DOCUMENTS

| CN | 109795564 A | | 5/2019 |
| DE | 19948364 A1 * | 4/2000 | ........... B62D 29/008 |
| JP | 2006321404 A * | 11/2006 |

* cited by examiner

*Primary Examiner* — Dennis H Pedder
(74) *Attorney, Agent, or Firm* — Vichit Chea; Price Heneveld LLP

(57) ABSTRACT

The present disclosure describes a vehicle including an inner wheelbase panel, a first panel, a second panel and a pillar that is coupled to the wheelbase panel. The pillar includes a wall, a first flange, a second flange, and a tunnel. The wall defines an inner cavity and an outer cavity. The first flange extends outwardly from the wall and the second flange extends inwardly from the wall. The vehicle includes baffle which extends through the tunnel and is sized and shaped to seal both the inner cavity and the outer cavity.

15 Claims, 12 Drawing Sheets

VEHICLE PILLAR PASS THROUGH FOR SEALING BAFFLE

BACKGROUND

Technical Field

The present disclosure generally relates to a baffle for sealing cavities of vehicles.

Description of the Related Art

Certain components of vehicles may include cavities, which may be sealed with components, such as baffles. For example, a C-pillar of a vehicle may include an inner cavity and an outer cavity, which would be sealed with two separate baffles.

BRIEF SUMMARY

The present disclosure provides an optimized sealing arrangement for cavities in a vehicle. For example, in one example embodiment, a vehicle includes an inner wheelbase panel, a first panel, a second panel, and a pillar coupled to the wheelbase panel. The pillar can include a wall which defines an inner cavity and an outer cavity, a flange that extends outwardly from the wall, and a baffle cavity extending, at least in part, through the wall. The vehicle can also include a baffle that extends through the baffle cavity, wherein the baffle is sized and shaped to seal the inner cavity and the outer cavity.

In another example embodiment, a vehicle pillar includes a first flange that has an arcuate shape, a wall portion extending from the first flange, a second flange extending from the wall portion, and a tunnel extending through the first flange.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
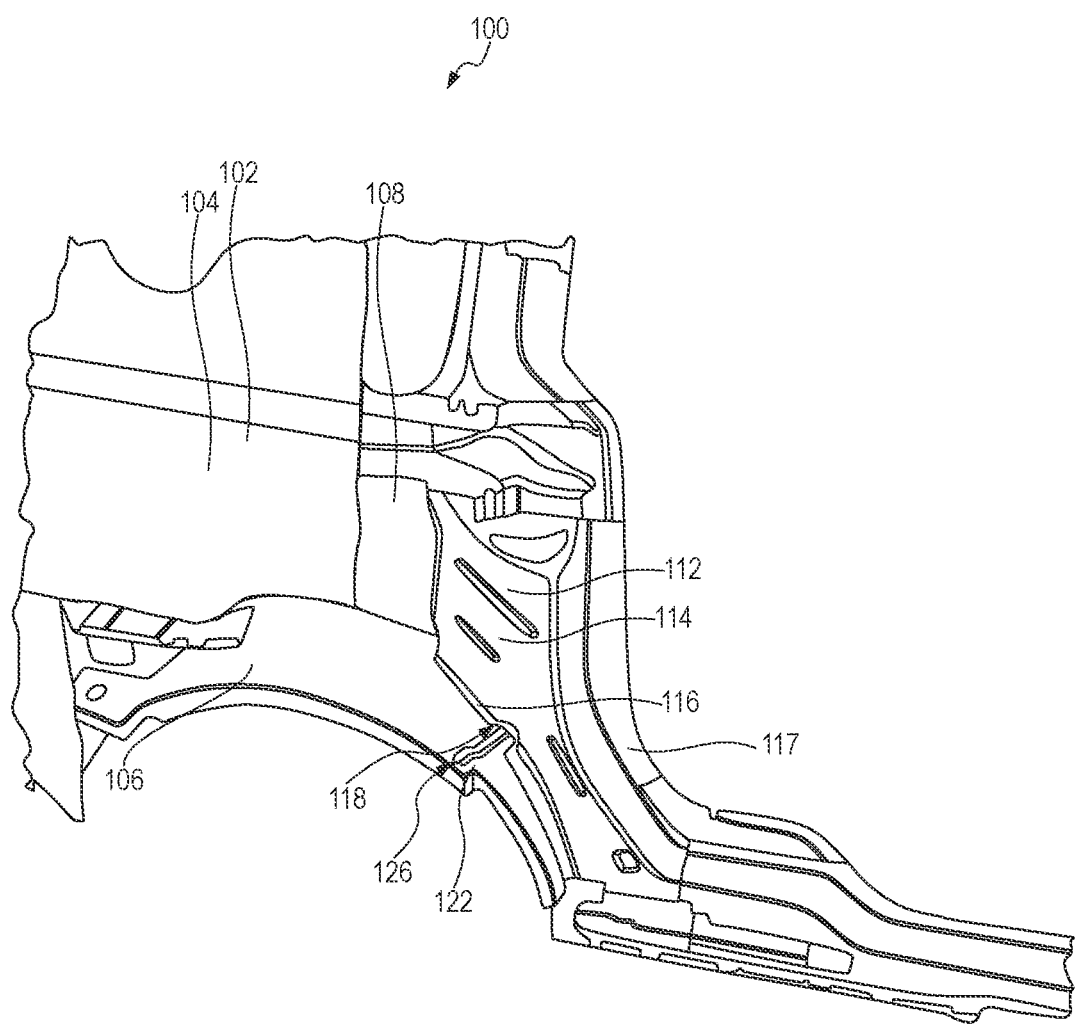
FIG. 1 is a side view of a portion of a vehicle viewed from an exterior of the vehicle, illustrating a wheelbase and C-Pillar region of the vehicle, according to an embodiment of the present disclosure.
Figure 2:
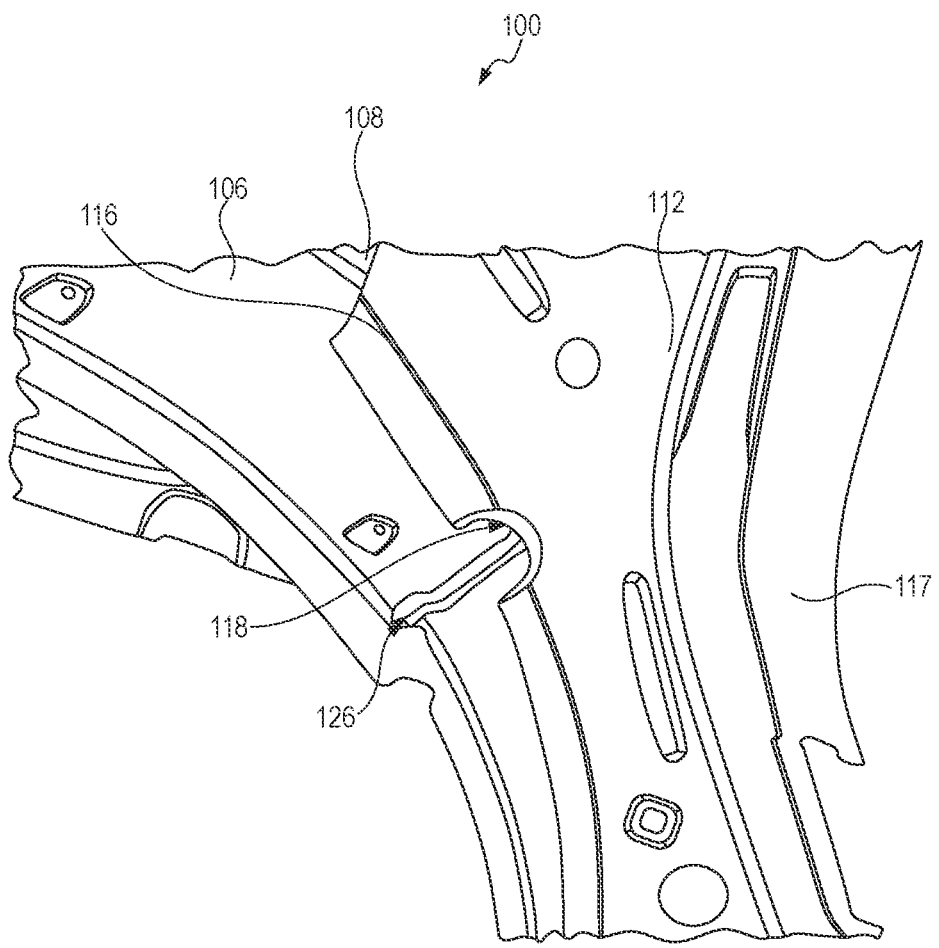
FIG. 2 is a side view of the vehicle of FIG. 1 with a skin panel removed for clarity of illustration and description.
Figure 3:
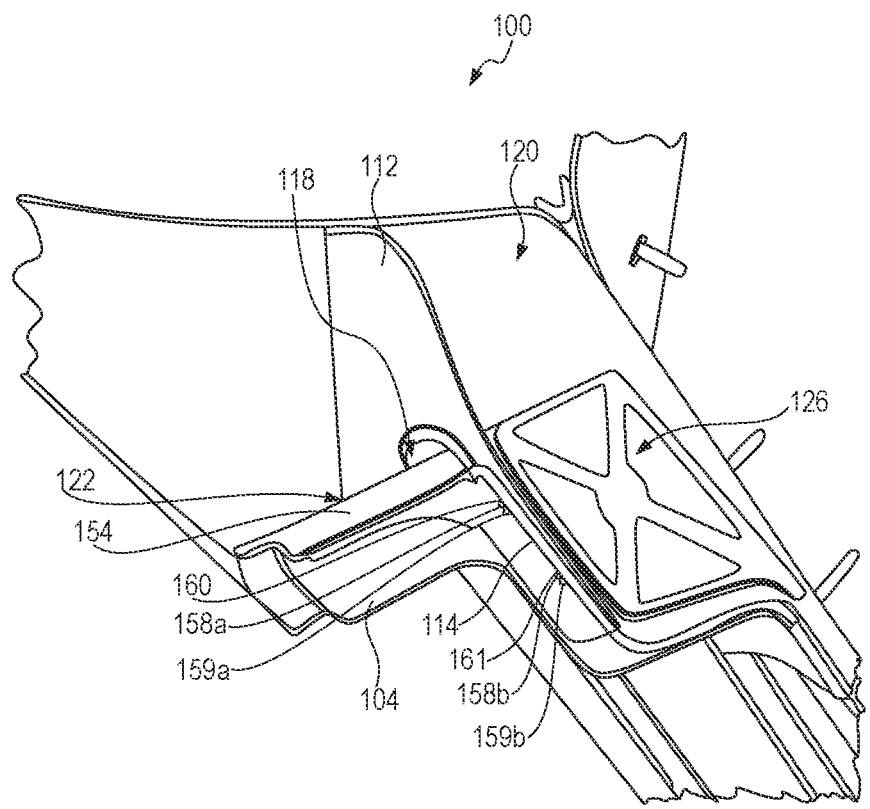
FIG. 3 is a breakaway top perspective view of the vehicle of FIG. 2, illustrating a baffle, according to an embodiment of the present disclosure.
Figure 4:
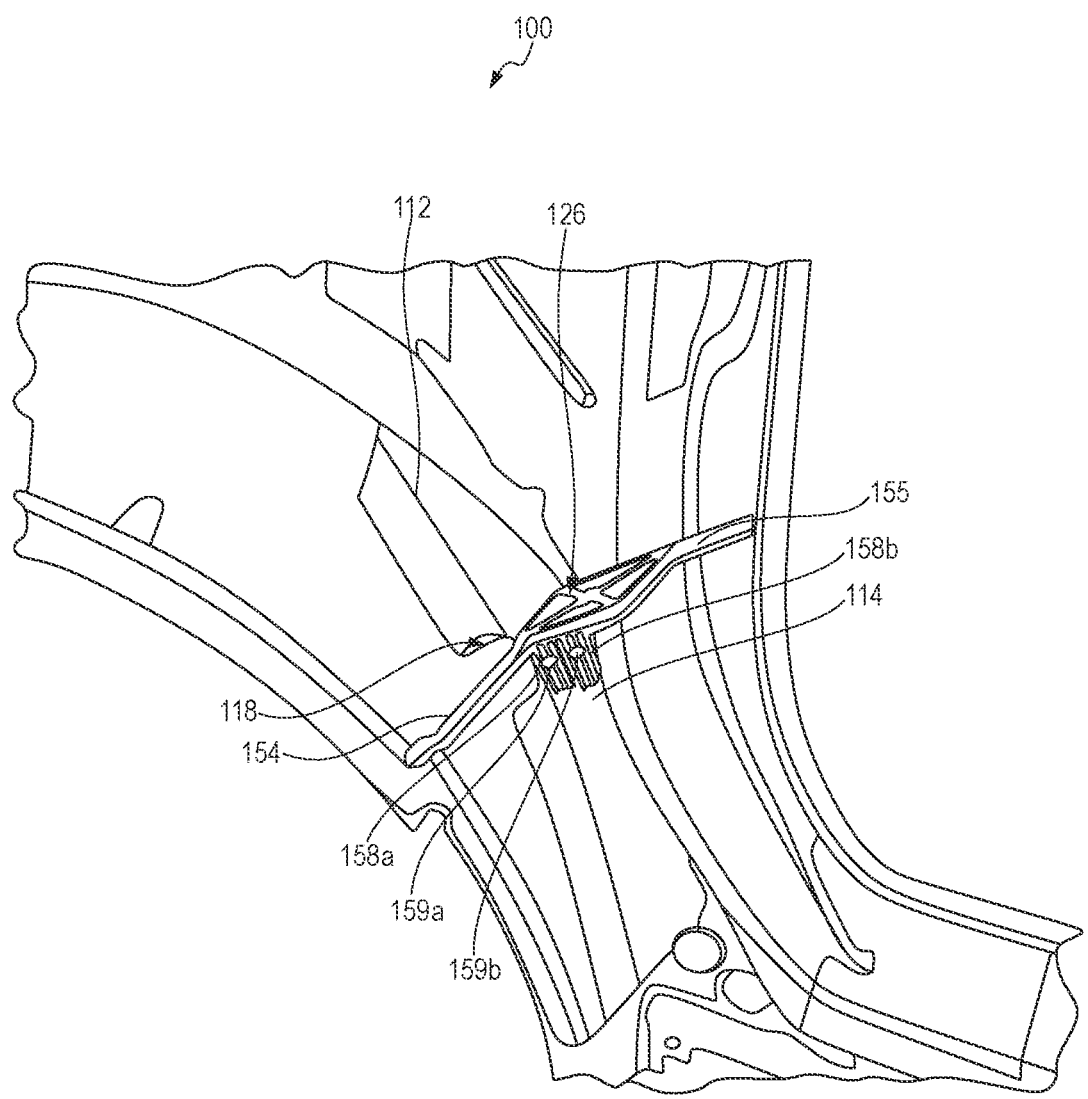
FIG. 4 is a breakaway side perspective view of the vehicle of FIG. 2, illustrating the baffle, according to an embodiment of the present disclosure.
Figure 5:
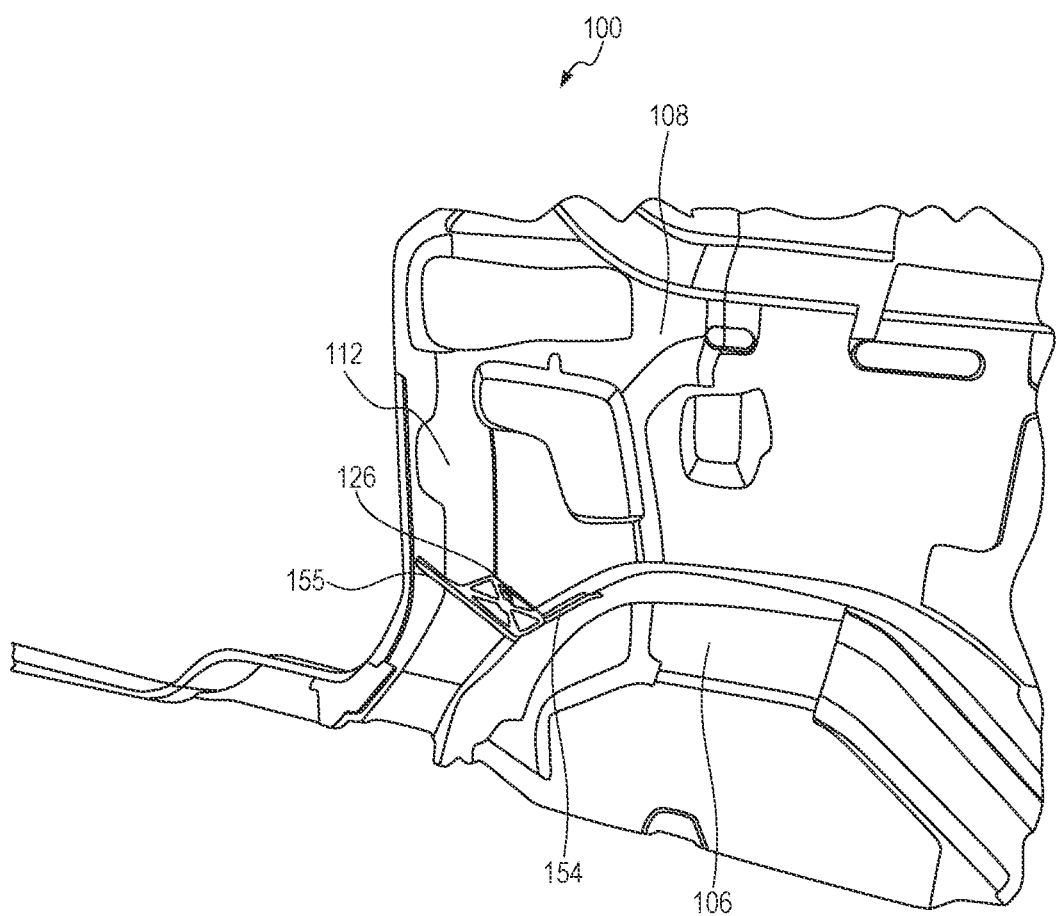
FIG. 5 is another breakaway side perspective view of the vehicle of FIG. 1 viewed from an interior of the vehicle, illustrating the baffle, according to an embodiment of the present disclosure.
Figure 6A:
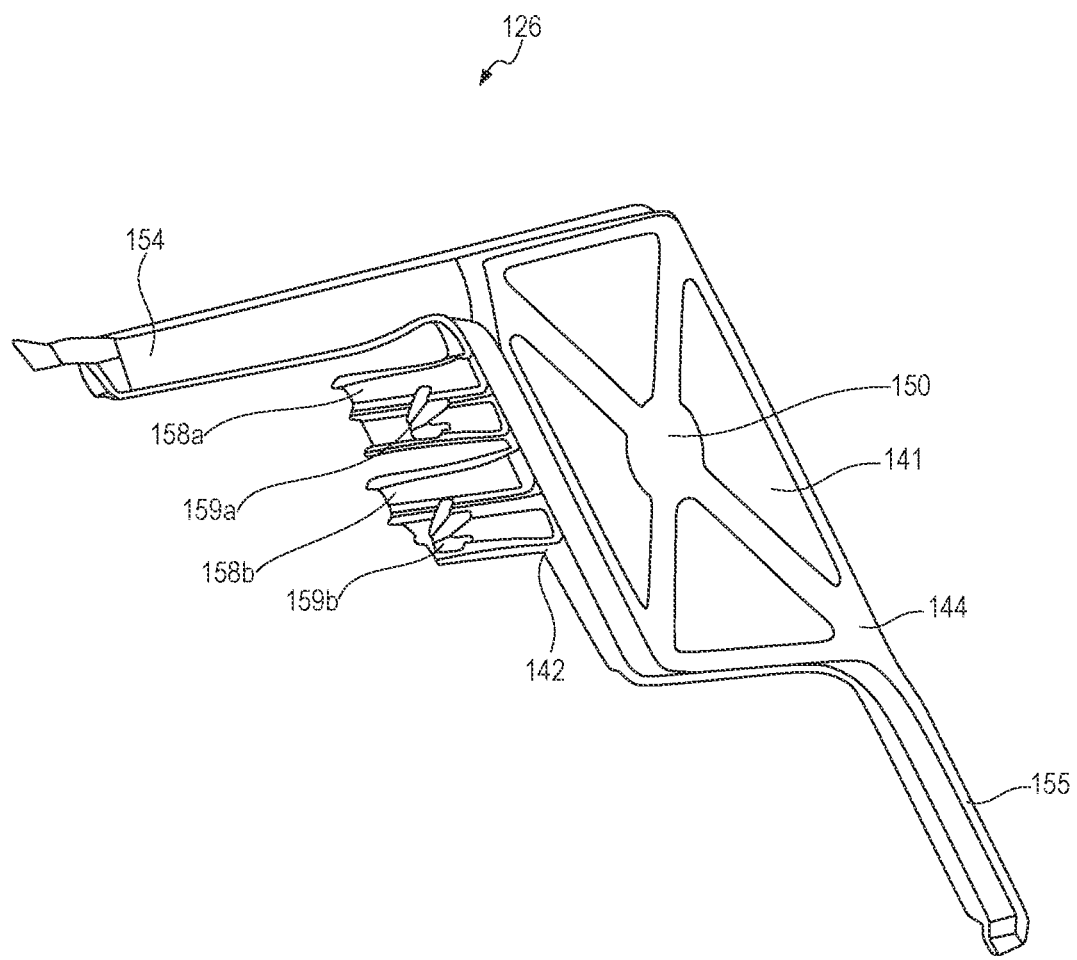
FIG. 6A is a perspective view of the baffle, according to an embodiment of the present disclosure.
Figure 6B:
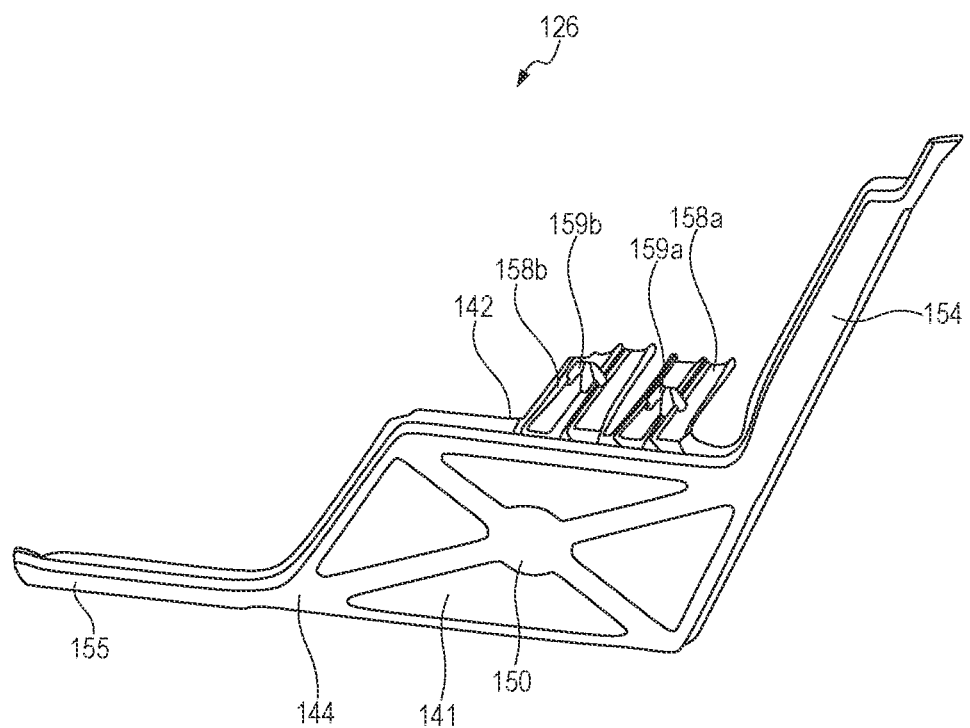
FIG. 6B is another perspective view of the baffle of FIG. 6A.
Figure 6C:
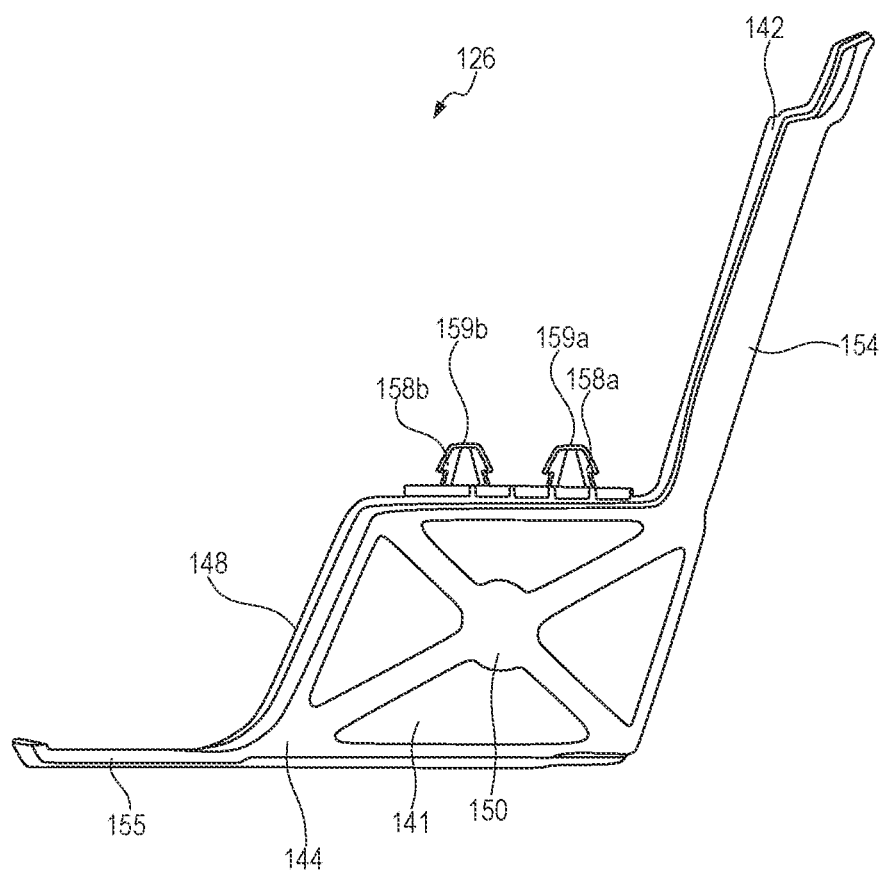
FIG. 6C is another perspective view of the baffle of FIG. 6A.
Figure 6D:
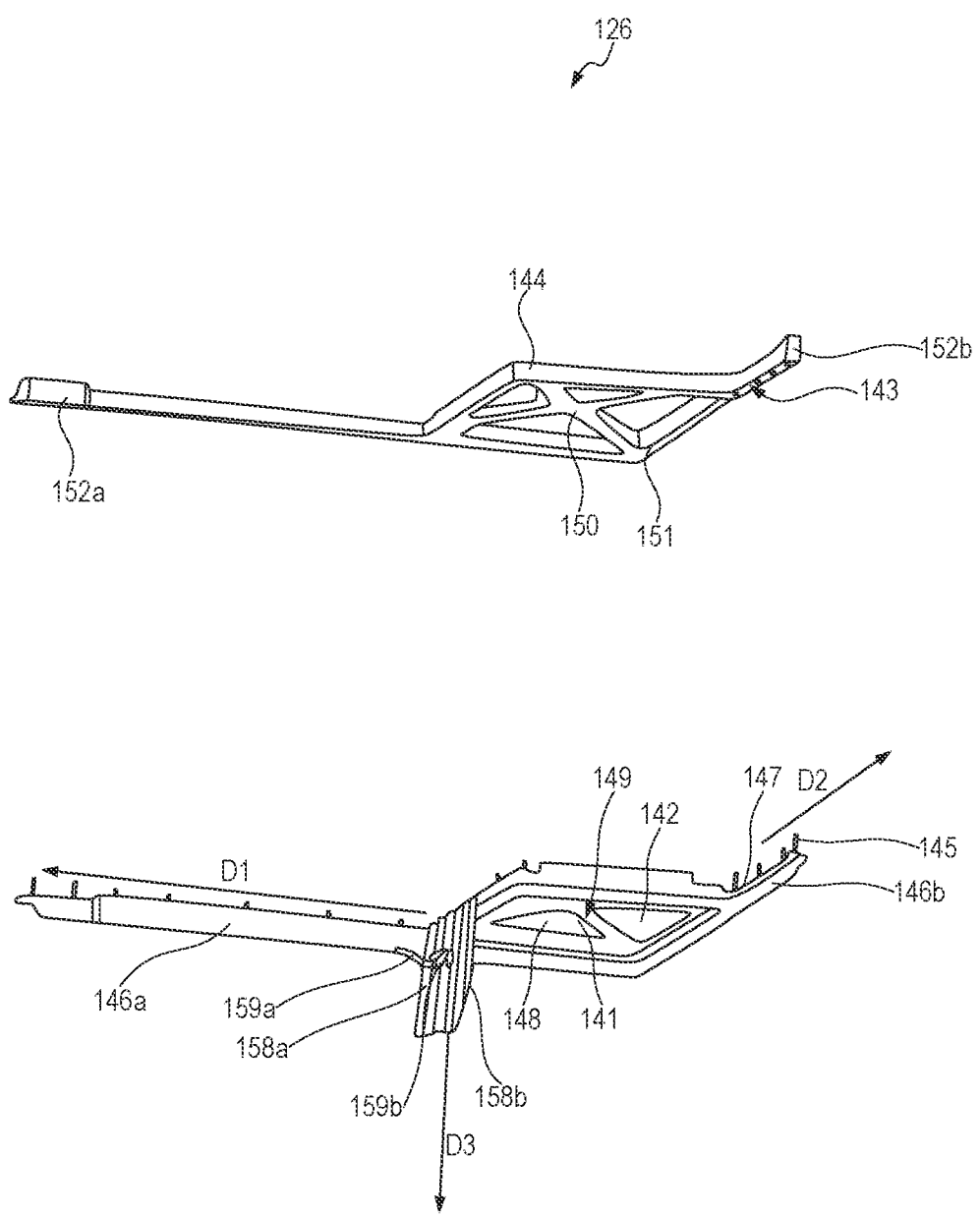
FIG. 6D is an exploded view of the baffle of FIG. 6A.

FIGS. 1-5 illustrate various views of a portion of a vehicle 100. The vehicle 100 includes vertical supports, such as vehicle pillars. The vehicle pillars are generally spaced in a fore-aft direction of the vehicle. For example, some vehicle pillars may include an A-pillar, a B-pillar, a C-pillar, and a D-pillar, arranged moving from a front of the vehicle 100 to a rear of the vehicle 100. FIGS. 1-5 illustrate a C-pillar 112 that is coupled to an exterior side 102 of a skin or side panel 104 of the vehicle 100. The C-pillar 112 is further coupled to an inner wheelbase panel 106 and an interior panel 108. The C-pillar 112 includes a wall portion 114, a first flange 116, and a second flange 117. The first flange 116 and the second flange 117 extend outwardly from the wall portion 114. As described above, the C-pillar 112 is coupled to the inner wheelbase panel 106. In particular, the first flange 116 is positioned adjacent to the inner wheelbase panel 106 and is coupled thereto. As shown in FIG. 3 in detail, when the C-pillar 112 is coupled to the inner wheelbase panel 106, the side panel 104, and the interior panel 108, the wall portion 114 separates an inner cavity 120 and an outer cavity 122. The vehicle 100, according to the present disclosure, includes a baffle 126 that is sized, shaped, and arranged to seal the inner and outer cavities 120, 122. In particular, the C-pillar 112 includes a cavity or tunnel 118 that extends through a portion of the C-pillar 112. In particular, the tunnel 118 extends through the wall portion 114 and the first flange 116. The tunnel 118 is sized, shaped, and arranged to provide access to the single baffle 126, which seals the inner and outer cavities 120, 122, as described in more detail below.

With reference to FIGS. 6A-6D, which illustrate the baffle 126 in detail, and continued reference to FIGS. 1-5, the baffle 126 includes a carrier 142 and a layer 144 of expandable material. The layer 144 is generally configured to expand in response to being activated, such as by application of heat, or other conditions such as moisture, or pressure. In an embodiment, the layer 144 of expandable material may be made from plastic, an epoxy-based, EVA (Ethylene Vinyl Acetate) based sealing foams, or other suitable material. As the layer 144 expands due to one or more conditions described above, the baffle 126 seals the inner and outer cavities 120, 122.

The layer 144 is coupled to the carrier 142 via a plurality of protruding pins 145. The pins 145 are sized and shaped to be coupleably received in corresponding apertures 143 provided in the layer 144. The carrier 142 includes a base portion 141 and a first carrier finger portion 146a and a second carrier finger portion 146b. The first carrier finger portion 146a extends outwardly from the base portion 141 in a first direction D1 and the second carrier finger portion 146b extends outwardly from the base portion 141 in a second direction D2. The base portion 141 includes an outer periphery 147 that surrounds a boss portion 148. The boss portion 148 includes a recess 149, which as described in more detail, is sized and shaped to coupleably receive the layer 144.

In particular, the layer 144 includes a central portion 150, which is sized and shaped to be secured in the recess 149 of the carrier 142 with an outer portion 151 of the layer 144 seated in the outer periphery 147 of the carrier 142. The layer 144 also includes a first layer finger portion 152a and a second layer finger portion 152b. The first layer finger portion 152a is coupleably secured to the first carrier finger portion 146a and the second layer finger portion 152b is coupleably secured to the second carrier finger portion 146b. In this manner, when the layer 144 is coupleably secured to the carrier 142, the baffle 126 is provided with a first finger portion 154 and a second finger portion 155.

The carrier 142 further includes a pair of tabs 158a, 158b. Each of the pair of tabs 158a, 158b extends outwardly from the base portion 141 in a third direction D3. Each tab 158a, 158b includes a respective protrusion 159a, 159b which extends outwardly from the tab 158a, 158b. The protrusions 159a, 159b are sized and shaped to couple the baffle 126 to the C-pillar 112.

Figure 7A:
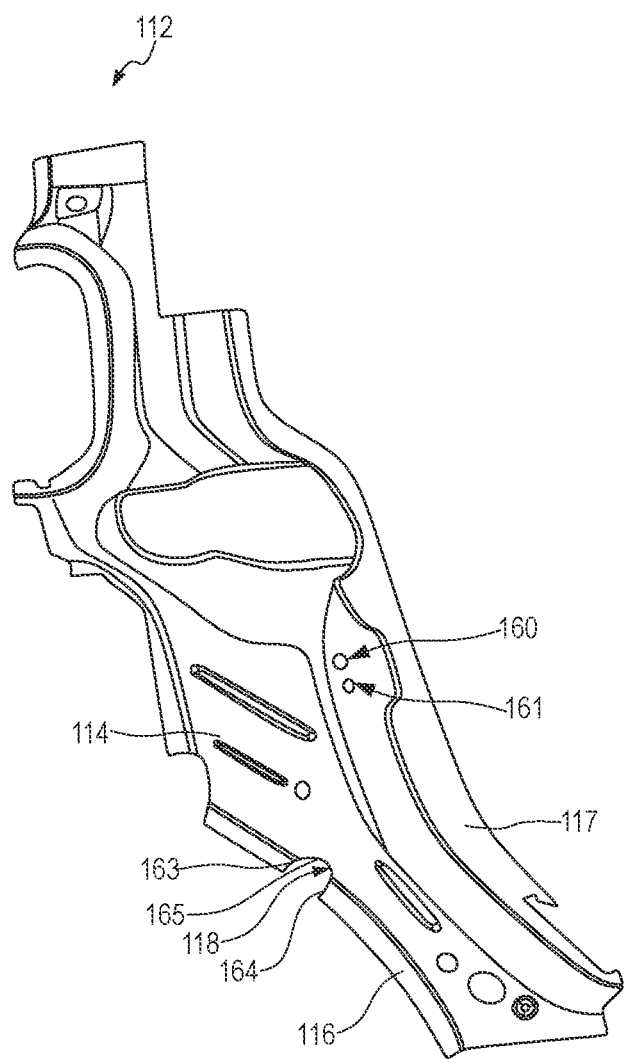
FIG. 7A is a perspective view of a pillar, according to an embodiment of the present disclosure.
Figure 7B:
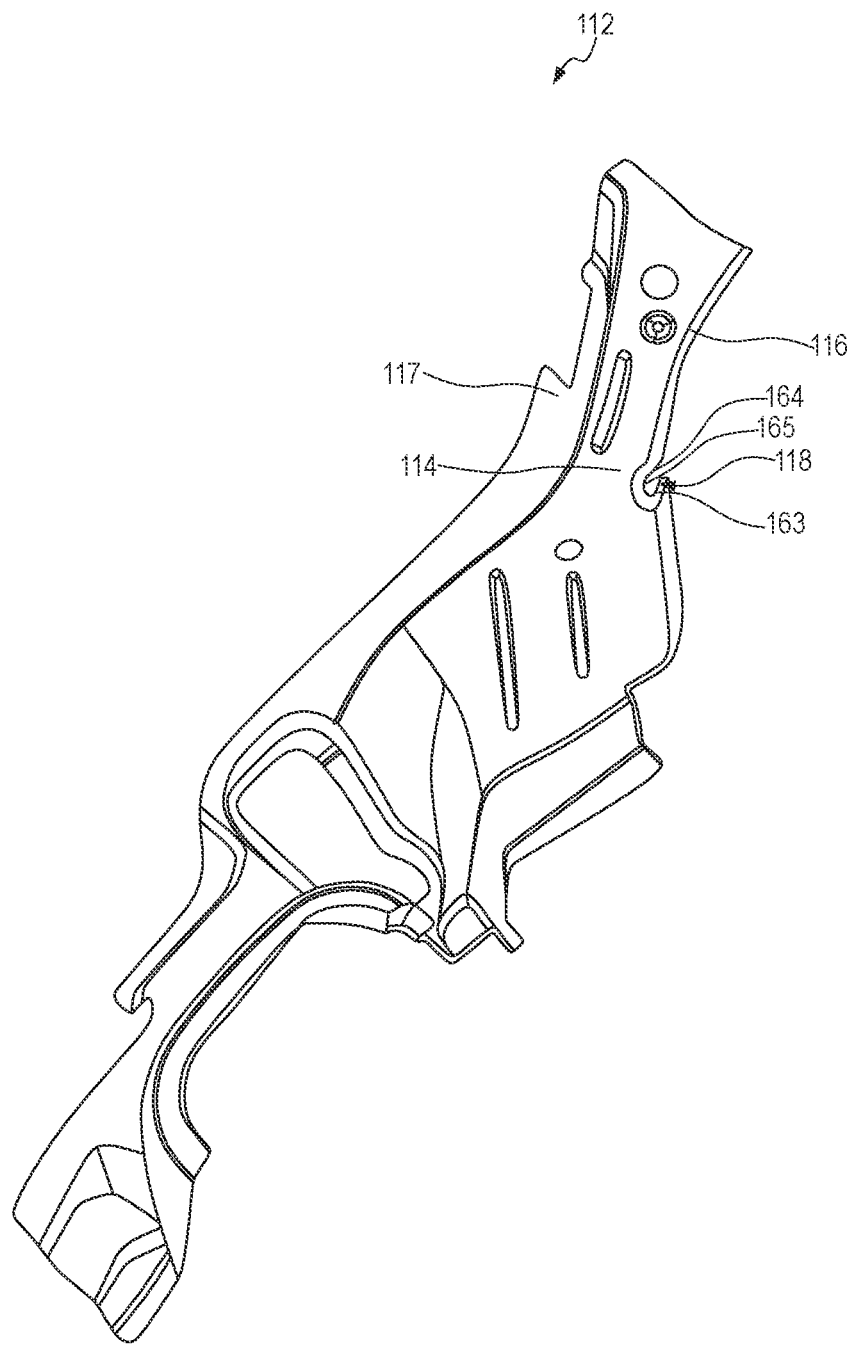
FIG. 7B is another perspective view of the pillar of FIG. 7A.
Figure 7C:
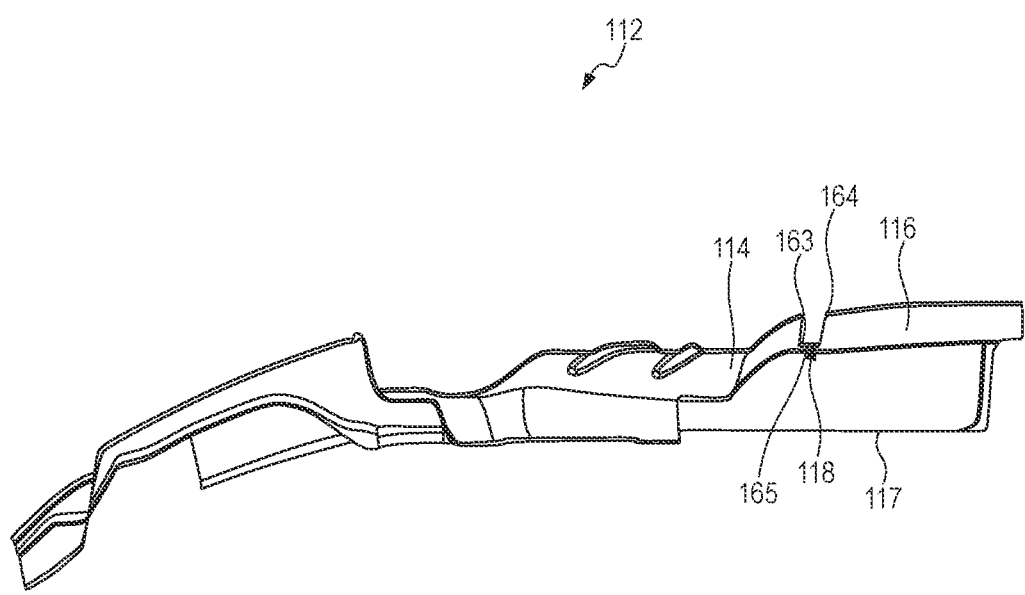
FIG. 7C is another perspective view of the pillar of FIG. 7A.

FIGS. 7A-7C illustrate the C-pillar 112 in more detail. As described above, the C-pillar 112 includes the wall portion 114, the first flange 116, and the second flange 117. The wall portion 114 has a generally C-shaped structure with the first and second flanges 116, 117 extending outwardly from respective ends of the wall portion 114. The wall portion 114 includes a pair of tab apertures 160, 161. The tab apertures 160, 161 are sized and shaped to coupleably receive the protrusions 159a, 159b. The first flange 116 has a generally arcuate shape. In particular, the first flange 116 has an arcuate shape that substantially matches an arcuate shape of the inner wheelbase panel 106, as shown in detail in FIGS. 1-5. Thus, when the C-pillar 112 is coupled to the inner wheelbase panel 106, the first flange 116 mates with the inner wheelbase panel 106. The tunnel 118 extends through a portion of the wall portion 114 and the first flange 116. The tunnel 118 includes a first portion 163 and a second portion 164. The first and second portions 163, 164 are generally parallel to each other. The tunnel includes a third portion 165, which is generally curvilinear and extends from the first portion 163 to the second portion 164.

As shown in FIGS. 1-7C, the single baffle 126 is coupled to the C-pillar 112 through protrusions 159a, 159b. The tunnel 118 is sized, shaped, and arranged to provide access to position the baffle 126 in the inner and outer cavities 120, 122 and, in particular, the first finger portion 154 extends through the tunnel 118. Thus, when the baffle 126 is coupled to the C-pillar 112, the single baffle 126 seals the inner and outer cavities 120, 122 as the layer 144 expands under one or more conditions described above.

Moreover, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
an inner wheelbase panel;
a first panel;
a second panel;
a pillar coupled to the wheelbase panel, the pillar having:
  a wall which defines an inner cavity and an outer cavity;
  a flange that extends outwardly from the wall; and
  a baffle cavity extending, at least in part, through the wall; and
a baffle that extends through the baffle cavity, the baffle sized and shaped to seal the inner cavity and the outer cavity.

2. The vehicle of claim 1 wherein the flange is sized and shaped to couple the pillar to the inner wheelbase panel.

3. The vehicle of claim 2 wherein the inner wheelbase panel has an arcuate shape.

4. The vehicle of claim 3 wherein the flange is sized and shaped to mate with the arcuate shape of the inner wheelbase panel.

5. The vehicle of claim 1 wherein the baffle cavity is defined by a first portion, a second portion, and a third portion.

6. The vehicle of claim 5 wherein the first portion and the second portion are parallel to each other, and the third portion extends curvilinearly from the first portion to the second portion.

7. The vehicle of claim 1 wherein the baffle includes a finger portion that extends through the baffle cavity.

8. The vehicle of claim 1 wherein the baffle includes a pair of tabs, each of the pair of tabs including a protrusion which removably couples the baffle to the pillar.

9. The vehicle of claim 1 wherein the baffle includes a carrier and an expandable layer.

10. The vehicle of claim 1 wherein the baffle includes:
a first finger portion that extends through the baffle cavity;
a second finger portion that is positioned adjacent to the first panel; and
a base portion, the first and second portions each extending outwardly from the base portion.

11. A vehicle apparatus, comprising:
a pillar having a wall which defines an inner cavity and an outer cavity, a flange that extends outwardly from the wall, and a baffle cavity that extends, at least in part, through the flange; and
a sealing baffle that extends through the baffle cavity, the baffle sized and shaped to seal the inner cavity and the outer cavity.

12. The vehicle apparatus of claim 11 wherein the baffle cavity is defined by a first portion, a second portion, and a third portion.

13. The vehicle apparatus of claim 11 wherein a first portion and a second portion are parallel to each other, and a third portion extends curvilinearly from the first portion to the second portion.

14. The vehicle apparatus of claim 11 wherein the baffle includes a finger portion that extends through the baffle cavity.

15. The vehicle apparatus of claim 11 wherein the baffle includes a pair of tabs, each of the pair of tabs including a protrusion which removably couples the baffle to the pillar.

* * * * *